United States Patent
Ali et al.

[11] 3,773,528
[45] Nov. 20, 1973

[54] IMPROVED UV TRANSMITTING LANTHANIUM-ZINC-BORATE GLASS COMPOSITION

[75] Inventors: Mir Akbar Ali, Evanston; William R. Bratschun, La Grange, both of Ill.; Alexis G. Pincus, New York, N.Y.

[73] Assignee: IIT Research Institute, Chicago, Ill.

[22] Filed: Jan. 28, 1971

[21] Appl. No.: 110,671

[52] U.S. Cl............... 106/47 R, 106/47 Q, 106/50
[51] Int. Cl....... C03c 3/14, C03c 3/24, C03c 13/00
[58] Field of Search........................... 106/47 Q, 50

[56] References Cited
UNITED STATES PATENTS

| | | | |
|---|---|---|---|
| 3,074,805 | 1/1963 | Geffeken et al. | 106/47 Q |
| 3,100,714 | 8/1963 | Bromer et al. | 106/47 Q |
| 3,150,990 | 9/1964 | Faulstich | 106/47 Q |
| 3,503,764 | 3/1970 | Young | 106/54 |
| 3,607,322 | 9/1971 | Brady et al. | 106/47 Q |
| 3,677,778 | 7/1972 | Ali et al. | 106/47 R |

OTHER PUBLICATIONS

McMillan, P. W., "Glass–Ceramics," Academic Press, New York 1964, pg, 49 TP862.M3 C.4.

*Primary Examiner*—A. B. Curtis
*Assistant Examiner*—Mark Bell
*Attorney*—Andreson, Luedeka, Fitch, Even & Tabin

[57] ABSTRACT

An improved ternary lanthanum-zinc-borate glass composition having improved ultraviolet light transmission in near ultraviolet spectral range, and a process for preparing such a glass composition wherein the near ultraviolet light transmission is improved by small amounts of compounds such as lanthanum and zinc fluorides and chlorides, and tin, arsenic and antimony oxides.

5 Claims, No Drawings

IMPROVED UV TRANSMITTING LANTHANIUM-ZINC-BORATE GLASS COMPOSITION

The present invention relates to glass compositions. More particularly, the present invention is directed to glass compositions having improved transmission properties in the near ultraviolet range of the electromagnetic spectrum, and to processes for improving the near ultraviolet transmission of glass compositions designed for use in the ultraviolet spectrum. The present invention also relates to improved optical fibers and fiber optic devices fabricated from such glass compositions.

Fiber optic devices are conventionally constructed from optical fibers having a central glass core which has a relatively high index of refraction in comparison with the refractive index of a cladding glass sheath which surrounds the core glass. A primary requirement of a glass for use in fiber optic systems, and particularly for the core glass of a composite clad-core fiber, is that the glass effectively transmit light of the designated frequency or spectral range. In addition, in order to confine transmitted light to the core glass, it is important that the core and cladding glasses have the proper relationship with respect to their indices of refraction.

The numerical aperture (N.A.) of a fiber comprising a core and cladding glass sheath is an indication of the efficiency with which the optical fiber confines light which is directed through its length, and is defined by the equation N.A. = $\sqrt{N_1^2 - N_2^2}$ where $N_1$ and $N_2$ are the refractive indices of the core and cladding respectively. Accordingly, it is desirable for efficient transmission that core and cladding glasses be provided which have a relatively large difference in refractive indices. Preferably this difference should result in a numerical aperture greater than about 0.80. Thus, for clad glasses having an index of refraction of from about 1.45 to about 1.56, a core glass should be provided with a refraction index of at least about 1.70.

It is important that the glasses used in fabricating optical fibers be capable of being drawn or shaped into filamentary, fiber form which is stable in the glassy state. Furthermore, when fibers are fabricated of a central core glass and an outer cladding glass, it is important that these glasses be physically and chemically compatible with respect to such properties as thermal expansion, melt temperature and viscosity, and interface stability. Moreover, the development of fiber optic devices has included a reduction in the diameter of the optical fibers employed. The properties of ready filament or fiber formation from a glassy melt and stability against devitrification, and the importance of compatibility between the core and cladding glass composition, are of increasing value and criticality as the size of fibers employed in fiber optic devices decreases.

While the opposite is true for glasses and other materials designed for transparency to the visible spectrum, there are relatively few conventional materials suitable for transmitting ultraviolet light, and such materials in general have numerous shortcomings such as high water sensitivity or solubility, too low an index of refraction, insufficient workability, drawability or stability against devitrification, etc.

Accordingly, there is a need for an ultraviolet-transmitting glass, which is not water sensitive, and which may be readily cast, molded, ground, or otherwise fabricated into useful optical shapes. Furthermore, there is a need for such glasses having high transmission in the near ultraviolet spectral region which in addition have properties suitable for manufacturing fiber optic devices to be used in combination with photochemical and photoelectrical systems functioning in the ultraviolet spectral range. An example of such a system is a cathode ray tube read-out device having a fiber optic faceplate composed of multiple, high refractive index fibers arranged in parallel in a low refractive index glass matrix. Depending upon the availability of suitable ultraviolet-transmitting glasses, ultraviolet radiation emitted by phosphors which are excited by the electron beam of the cathode ray tube at the interior surface of the faceplate can be transmitted therethrough to the outer surface of the faceplate where the image may be recorded, for example by ultraviolet photosensitive paper or ultraviolet-polymerizable monomer-polymer systems. A vacuum tight, glass faceplate composed of multifibers, wherein each fiber in the faceplate transmits an image element to be written directly, is potentially far superior to conventional ultraviolet high speed cathode ray tube systems for high speed printing in which the phosphor image is transmitted through a clear face plate and imaged by means of a lens system. Furthermore, provided the core and clad glasses of the fiber optic faceplate are compatible, the faceplate will have the strength and temperature resistance to withstand vacuum bake-out cycles used in cathode ray tube fabrication.

Ternary lanthanum-zinc-borate glass compositions suitable for optical fibers for operation in the near ultraviolet region, including wavelengths from 300 to 400 nanometers, have been disclosed in U.S. Pat. application Ser. No. 858,450 to Ali et al., filed Sept. 16, 1969, entitled "Glass Composition" now U.S. Pat. No. 3,677,778. Glass compositions suitable for use as a clad glass for optical fibers for use in the near ultraviolet region are disclosed in U.S. Pat. application Ser. No. 28,012 to Ali et al., filed Apr. 13, 1970, entitled "U.V. Transmitting Glass Composition and Article" now U.S. Pat. No. 3,671,380. Both of the abovementioned U.S. patent applications are herein incorporated by reference.

In U.S. Pat. application Ser. No. 858,450, glass compositions are disclosed which are the fusion product of essentially chemically pure $H_3BO_3$, $La_2O_3$, and ZnO in ranges of percentages by weight as follows: $H_3BO_3$, between about 50 and about 57 percent; $La_2O_3$, between about 30 and about 33 percent; ZnO, between about 10 and about 17 percent. This patent application notes that the additions of some elements or oxides to the ternary system is considered deleterious and is to be avoided. In particular, it is noted that ultraviolet absorbers Fe, Ti, S, U. Ge, Mr, Cu, Ag, Au, V, Nb, Ta, Cr, Mo, W, Re, Pt, Rh, Bi, Pb, Ce and some of the other rare earths are to be avoided, and that even trace amounts of these materials have a deleterious effect on the transmission efficiency of the glass employed. Accordingly, selection of starting materials for purity is considered important, and $H_3BO_3$ and ZnO of standard reagent grade purity and $La_2O_3$ of 99.997 percent purity, were sufficiently free of harmful impurities to provide glasses having a refractive index in excess of 1.70 and a light transmission at 320 nanometers in excess of 50 percent through a one-half inch thickness.

However, while a value of 50 percent transmittance at 320 nanometers through a one-half inch thickness, obtained by using glass raw materials of such purity, is considered to be a high ultraviolet transmittance value, such a value still indicates the loss of a considerable amount of the incident ultraviolet light, and glasses having higher transmittance values are certainly very desirable and are achievable in ternary lanthanum-zinc-borate glass compositions through the partial or complete prevention or elimination of all traces of ultraviolet-absorbing impurities.

Unfortunately, prevention or removal of impurities from the starting materials, and prevention of contamination during melting, fining, fabrication, etc. present difficulties, technical as well as practical for econimical manufacture; for example, extremely high purity raw materials are difficult or time-consuming to prepare and accordingly are very expensive. In this regard, it is noted that a primarily deleterious impurity is the ferric ion, and complete avoidance of iron impurities is very difficult. This is particularly unfortunate since ferric ions have a broad and relatively intense absorption spectrum in the near ultraviolet region, such that the presence of even exceedingly minute quantities of iron can have a deleterious effect on the ultraviolet transmission efficiency of ternary lanthanum-zinc-borate glass compositions. Other ultraviolet-absorbing impurities share such adverse properties in varying degrees.

Accordingly, a relatively simple and effective method for improving the near ultraviolet transmission of ternary lanthanum-zinc-borate glass compositions which would function by the addition of materials to counteract ultraviolet absorption in such glass compositions would be very desirable, as would such a process which would provide improved ultraviolet transmission for such glass compositions which are the fusion products of essentially chemically pure $H_3BO_3$ (about 50 to 57 percent by weight), $La_2O_3$, (about 30 to 33 percent by weight) and $ZnO$ (about 10 to 17 percent by weight), which process would not significantly adversely affect the high index of refraction, workability, stable vitreous state and other properties of such compositions which are beneficial for use in fiber optics applications.

It is an object of the present invention to provide a ternary lanthanum-zinc-borate glass composition, the ultraviolet transmission of which might be deleteriously affected by the presence of very minor amounts of ultraviolet-absorbing impurities such as ferric ions, which composition includes an effective amount of an additive to counteract ultraviolet absorption.

It is a further object of the present invention to provide a relatively simple and effective method for improving the near ultraviolet transmission of ternary lanthanum-zinc-borate glass compositions, and particularly of such ternary glass compositions which are the fusion product of essentially chemically pure $H_3BO_3$, $La_2O_3$, and $ZnO$ in ranges of percentages by weight as follows: $H_3BO_3$, between about 50 and about 57 percent; $La_2O_3$, between about 30 and about 33 percent; $ZnO$, between about 10 and about 17 percent.

It is a further object to provide such glass compositions which are suitable for optical fibers and fiber optic devices.

These and other objects are more particularly set forth in the following detailed description.

The present invention is directed to an improved ternary lanthanum-zinc-borate glass composition having ultraviolet light transmitting properties, the ultraviolet light transmission of which might be deleteriously affected by the presence of very minor amounts of impurities such as ferric ions, wherein the composition consists essentially of the fusion product of essentially chemically pure base glass components $H_3BO_3$, $La_2O_3$ and $ZnO$, and less than about 0.5 percent by weight based on the total weight of said base glass components of a compound for counteracting near ultraviolet light absorption in said glass composition, wherein said compound is selected from tin oxide, arsenic oxide and antimony oxide, wherein said base glass components are proportioned to provide a ternary glass upon fusion.

The present invention is also directed to a process for improving the near ultraviolet transmission in ternary lanthanum-zinc-borate glass compositions, comprising mixing an effective amount of an additive selected from lanthanum chloride, lanthanum fluoride, zinc chloride, and zinc fluoride, and oxides of tin, arsenic and antimony, with the other raw-material components of the glass batch charge prior to fusion and melting thereof, and subsequently heating the additive material and the other raw-material components to provide a homogenous melt of the glass composition.

The raw material employed to make the ternary lanthanum-zinc-borate glass compositions should preferably be of such purity that the glasses have a transmission of at least about 50 percent at 320 nanometers for a one-half inch thickness of the glass, although more expensive raw materials of even higher purity may of course also be used. For raw material $H_3BO_3$ and $ZnO$, reagent grade purity is generally sufficient in this regard, while for $La_2O_3$, which has a tendency to include ultraviolet absorbing impurities, it is best to use at least the 99.997 percent pure material. Of course, other suitable raw materials for making fusion products of essentially chemically pure $H_3BO_3$, $La_2O_3$ and $ZnO$, such as boric oxide and lanthanum and zinc carbonates, and lanthanum and zinc borates, must be provided in sufficient purity if they are to be used in manufacturing a ternary $H_3BO_3$, $La_2O_3$, $ZnO$ fusion product which would have the desired ultraviolet transmission.

Furthermore, it is also important that the additive material itself not introduce any substantial quantity of deleterious ultraviolet absorbing impurities into the glass composition, and in this regard it is advisable to use additive materials of at least C P and preferably reagent or purer grade, depending upon the level of ultraviolet light absorbing impurities therein.

There are generally two classes of additive materials which are employed to counteract near ultraviolet light absorption in ternary lanthanum-zinc borate glasses, chlorides and fluorides of lanthanum and zinc, and oxides of tin, arsenic and antimony.

The lanthanum chloride, lanthanum fluoride, zinc chloride or zinc fluoride type of component is employed to improve the ternary glass composition by mixing these compounds of reagent grade with the raw materials glass charge for the ternary glass composition prior to fusion. However, it is possible that other, less practical methods or compounds might be employed by one skilled in the art to achieve the beneficial effects of a lanthanum or zinc fluoride or chloride additive component in a ternary lanthanum-zinc-borate glass composition, as will be mentioned hereinafter.

The tin, arsenic or antimony oxide type of additive component may be incorporated into the glass composition by mixing the oxides of these elements with the other components of the glass composition and subsequently heating the mixture to provide the fusion product. Preferred are reagent grade SnO, $SnO_2$, $As_2O_3$, $As_2O_5$, $Sb_2O_3$, and $Sb_2O_5$. Of course, hydroxides or hydrated oxides might be used to provide the oxide component of the improved glass composition, and it will be clearly apparent to one skilled in the art that other compounds of these elements might also be used to achieve the purpose. For example, salts of these elements with decomposable or volatile anions such as carbonate might be used, as well as suitable compounds with oxy, etc. anions of such elements such as zinc arsenate. When employing such other materials, the amounts employed are calculated according to standard practice in terms of the oxides. Oxides of tin and arsenic are preferred additive components for the ternary glass compositions, and of these, arsenic oxide, and particularly trivalent $As_2O_3$, has been found to be exceptionally effective in improving ultraviolet transmission.

In the case of tin and arsenic oxides, it has been found that the optimum amount of addition of these oxides, to a glass batch of raw material $H_3BO_3$, $La_2O_3$ and ZnO which are proportioned so as to provide a ternary glass composition upon fusion, is up to about 0.5 percent by weight, and preferably about 0.05 percent by weight, based on the weight of these raw materials. It is believed that antimony oxide will behave similarly. Additions of 0.5 percent or more have been found to be undesirable. For example, excessive addition of arsenic oxides, which are particularly preferred additive materials, may tend to corrode the crucible or fabrication equipment in which the glass is melted, thereby not only contaminating the glass composition, but also adversely affecting production equipment.

In calculating the amount of a compound to be added to a ternary lanthanum-zinc-borate glass composition batch of raw materials other than $H_3BO_3$, $La_2O_3$ and ZnO, the amount is calculated according to standard practice as based on effective amounts of these three components in the batch.

It has been found that when zinc chloride is mixed with the other raw materials of a glass batch of $H_3BO_3$, $La_2O_3$ and ZnO proportioned so as to provide a ternary glass composition upon fusion, that optimum results with respect to transmission improvement are achieved by adding up to about 5 percent by weight, based on the weight of these raw materials. Additions above this amount have a deleterious effect on the properties of the glass. It is believed that the behavior of lanthanum chloride will be similar, and preferably from about 3 to about 5 percent by weight of lanthanum and zinc chloride are added to the raw material charge based on the weight of $H_2BO_3$, $La_2O_3$ and ZnO. On the other hand, zinc fluoride has been found to be optimally added to these batch raw materials in an amount of up to about 0.5 percent by weight based on the total weight of $H_3BO_3$, $La_2O_3$ and ZnO and higher amounts such as about 5.0 percent by weight have been found to be very undesirable. It is believed that lanthanum fluoride will behave similarly, and these fluorides are preferably employed in amounts between about 0.3 and about 0.5 percent by weight based on the weight of $H_3BO_3$, $La_2O_3$ and ZnO. This relatively large amount of the chloride and even of the fluorides, required to show optimum improvement in ultraviolet transmission is believed to be due to the difficulty of incorporating volatile chlorides in glasses.

It is particularly preferred that the additive materials be incorporated into a glass composition which is the fusion product of essentially chemically pure $H_3BO_3$, $La_2O_3$, and ZnO in ranges of percentages by weight as follows: $H_3BO_3$, between about 50 and about 57 percent, $La_2O_3$, between about 30 and about 33 percent; ZnO, between about 10 and about 17 percent. A particularly preferred glass composition for incorporation of the additive is the fusion product of about 54% $H_3BO_3$, 32.7% $La_2O_3$ and 13.3% ZnO. These glasses with the additive materials incorporated therein retain the excellent combination of properties of the glasses without the additives.

TABLE

| Batch number | Raw material composition, percent by weight | | | Additive material and percent by weight of raw materials | Internal transmission at 320 n. ½ in. thickness, percent |
|---|---|---|---|---|---|
| | $H_3BO_3$ | $La_2O_5$ | ZnO | | |
| 1 | 54.0 | 32.7 | 13.3 | None | 58.0 |
| 2 | 54.0 | 32.7 | 13.3 | 5% $ZnCl_2$ | 65.0 |
| 3 | 54.0 | 32.7 | 13.3 | 0.5% $ZnF_2$ | 60.0 |
| 4 | 54.0 | 32.7 | 13.3 | 0.05% $SnO_2$ | 61.0 |
| 5 | 54.0 | 32.7 | 13.3 | 0.05% $As_2O_5$ | 75.6 |
| 6 | 54.0 | 32.7 | 13.3 | 0.05% $As_2O_3$ | 79.0 |

The Table illustrates the composition of several glasses prepared and formulated in accordance with the present invention, including the preferred above compositions designated as batches number 5 and 6. The percentage of additive materials is by weight of the raw materials. The starting components of the compositions were all of reagent grade purity except for the $La_2O_3$ which was of 99.997 percent purity. The glass compositions were prepared by weighing the indicated weight percentages of components in powder form and mixing them together. Fusion was achieved in a pure platinum crucible maintained at a temperature of 1,050°C. for eight hours in a pure alumina muffle furnace during which time it is believed the major proportion of the zinc chloride of batch number 2 was volatilized. Although higher temperatures and longer times are not recommended, the particular temperatures and times employed in the fusion are within the ordinary skill of the art and may be varied as suited for different processing equipment and production quantities.

Upon cooling, the glass compositions were clear and colorless, had a refractive index in excess of 1.70 and could easily be fabricated into desired forms, for example into bubble-free glass fibers of a diameter of 5 mils or less.

The Table shows the effect of incorporating various additives into a preferred base glass composition which is the fusion product of 54.0% $H_3BO_3$, 32.7% $La_2O_3$, and 13.3% ZnO, by weight (or 62.32% $B_2O_3$, 14.34% $La_2O_3$ and 23.35% ZnO in terms of mole percent). As may be seen from the Table, the additive materials provide a substantial improvement in ultraviolet transmittance, and the improvement provided by the very small amounts of the arsenic oxides provides a particularly dramatic improvement.

While we do not wish to be bound to a theoretical explanation with regard to the demonstrated improvement, it is believed that the addition of fluoride or chloride ions serves to make the glass more acidic. Such rendering of the glass more acidic is believed to have two effects, favoring the reduction of multivalent transition metal ions from a higher valence state to a lower valence state (i.e., the reduction of ferric ions to ferrous ions) and causing the transfer of impurity ions from network positions into modifier positions accompanied by an increase in the coordination number of the ion (i.e., causing the transfer of ferric ions from four-fold coordination in a network position in the glass into six-fold coordination in a modifier position in the glass). The change of status of the interfering ions from a higher valence state to a lower valence state, or from a state of lower coordination into a state of higher coordination, is believed to favor improved ultraviolet transmission in the near ultraviolet spectral range. It is noted that reduction of ferric ions to ferrous ions is believed to virtually eliminate ultraviolet absorption from that source by shifting it into the infrared region.

In the latter regard it is further theorized that tin, arsenic and antimony oxides are capable of participating in a reduction-oxidation couple with impurities having decreased ultraviolet absorption at a lower valence state, which will function to improve the ultraviolet transmission. For example, small amounts of SnO and $As_2O_3$ might reduce ferric ions to ferrous ions as follows:

$$2\ Fe^{3+} + Sn^{2+} \rightarrow 2\ Fe^{2+} + Sn^{4+}$$

In the case of arsenic it was found that $As_2O_3$, having $As^{3+}$ ions, was somewhat more effective in improving ultraviolet transmission than $As_2O_5$ which has $As^{5+}$ ions. However, it is believed that the incorporation of the pentavalent arsenic ion into the melt does not prevent reduction of interfering ions from occurring. For example, the electrochemical potential might cause the reaction to proceed as follows:

$$2\ Fe^{3+} + As^{5+} \rightarrow 2\ Fe^{2+} + As^{5+} + 2 \oplus$$

where $\oplus$ is a positive hole which is incorporated into the glass structure, or reacted with other impurities. Accordingly, any method or chemical compounds which might be employed to provide the proper amounts of these anions and cations without contaminating the basic glass might be used in view of this disclosure by one skilled in the art.

An alternative explanation of the effect of these additive materials might be a mechanism whereby the quantity or arrangement of valence or conduction electrons in the basic glass structure itself were altered.

Irrespective of a theoretical explanation for the mechanism, the incorporation of these materials provides the practical result of substantial improvement in the ultraviolet transmission of ternary lanthanum-zinc-borate glass compositions, which is produced by generally extraordinarily small amounts of an additive material.

The transmission improvement provided is quite beneficial from the standpoint of producing efficient near ultraviolet fiber optic devices such as cathode ray tube faceplates. For example, the glass composition of Batch Number 6 can be employed as the core glass with a suitable clad glass selected from the clad glasses disclosed in the above cited Ali et al. application Ser. No. 28,012, to provide a composite ultraviolet transmitting optical fiber. Such a fiber can be formed directly from the molten state by using a double platinum crucible furnace wherein the core and clad glasses are melted separately and brought together by means of a double coaxial orifice from which a composite fiber of about 5 microns is drawn with the cladding glass surrounding the core glass. To make a cathode ray tube faceplate, composite fibers are aligned in parallel and pressure fused to provide a fiber composite in which parallel core glass fibers are embedded in a matrix of the cladding glass.

The core glass fibers constitute about 60 weight percent of the fused composite. Plates are cut about one-half inch thick along a plane orthogonal to the axes of the core and clad glass composite, and these plates are annealed, ground, polished and cut into faceplate shape. The faceplates are then coated with an ultraviolet phosphor having an emission in the range of 320 nanometers and are fused to the remainder portion of a cathode ray tube instrument read out device such as for high speed computer character read out. The completed fiber optic cathode ray tube device records directly on 320 nanometer ultraviolet photosensitive paper. The system is capable of high speed and high accuracy operation.

The herein described ternary lanthanum-zinc-borate glass compositions including ultraviolet transmittance improving additives (and the processes for preparing such glass compositions), are novel and exhibit improved properties for the transmission of ultraviolet light. The improvement is achieved while retaining a high index of refraction and good physical, chemical and mechanical properties which are particularly useful in the growing field of fiber optics.

It should be understood however that fiber optics is only one environment in which the compositions and processes of the present invention find utility. The compositions are in no way restricted to such applications and also find utility in bulk form.

Various of the features of the invention are set forth in the following claims.

What is claimed is:

1. A ternary lanthanum-zinc-borate glass composition suitable for use as a core glass in a UV transmitting fiber optic cathode ray tube face plate and having a refractive index above about 1.70 and having improved ultraviolet light transmitting properties in the near ultraviolet range, said glass composition consisting essentially of the homogenous fusion product of essentially chemically pure base glass components $H_3BO_3$, $La_2O_3$ and ZnO proportioned to provide a ternary lanthanum-zinc-borate glass upon fusion, and an effective amount less that about 0.5 percent by weight, based on the weight of said base glass components, of an arsenic oxide compound for counteracting near ultraviolet light absorbents normally associated with said base glass components, said composition being the fusion product of said compound, and between about 50 and about 57 weight percent $H_3BO_3$, between about 30 and 33 percent $La_2O_3$, between about 10 and about 17 weight percent ZnO, said percentages being based on the total weight of $H_3BO_3$, $La_2O_3$ and ZnO, said glass composition having a transmission at 320 nanometers of at least about 75.6 through a one-half thickness thereof.

2. A composition according to claim 1 wherein said glass composition consists of the fusion product of said base glass components and about 0.05 percent by weight of said compound based on the weight of said base glass components.

3. A composition according to claim 1 wherein said compound is selected from $As_2O_3$ and $As_2O_5$.

4. A composition in accordance with claim 2 in which said additive compound is $As_2O_5$.

5. A composition according to claim 2 wherein said composition is the fusion product of arsenic oxide, and about 54 weight percent $H_3BO_3$, 32.7 weight percent $La_2O_3$ and about 13.3 weight percent ZnO.

* * * * *

UNITED STATES PATENT OFFICE
CERTIFICATE OF CORRECTION

Patent No. 3,773,528     Dated November 20, 1973

Inventor(s) Mir Akbar Ali, William R. Bratschun and Alexis G. Pincus

It is certified that error appears in the above-identified patent and that said Letters Patent are hereby corrected as shown below:

In the title, "LANTHANIUM" should read --LANTHANUM--.

Column 3, line 13, "econimical" should read --economical--.

Signed and sealed this 4th day of June 1974.

(SEAL)
Attest:

EDWARD M. FLETCHER, JR.
Attesting Officer

C. MARSHALL DANN
Commissioner of Patents